June 13, 1939.  O. A. TOLLEFSON  2,162,322

BATTERY ATTACHMENT

Filed April 28, 1938

Inventor
Orlo A. Tollefson, deceased
By Eleanora Tollefson,
Administratix.

By Clarence A. O'Brien
and Hyman Berman
Attorneys

Patented June 13, 1939

2,162,322

UNITED STATES PATENT OFFICE 2,162,322

BATTERY ATTACHMENT

Orlo Alvin Tollefson, deceased, late of Columbia County, Wis., by Eleanora Tollefson, administratrix, Antigo, Wis.

Application April 28, 1938, Serial No. 204,844

1 Claim. (Cl. 200—51)

This invention relates to a battery attachment, the general object of the invention being to provide means for changing a six-volt three cell battery to a two volt radio A battery through means of a socket member and plug for connecting the cells of the battery in parallel when the battery is being used for radio operation and for connecting the cells in series for recharging when the plug is removed.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
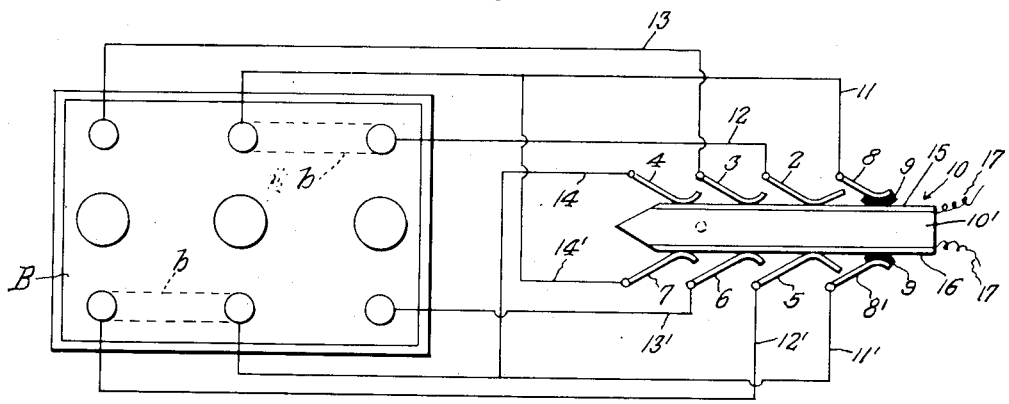
Figure 1 is a diagrammatic view showing the parts in position they occupy when the battery is being used for radio operation.

In these views the letter B indicates a three-cell battery and in carrying out the invention the straps b are either removed or cut so that the center cell is disconnected from the end cells. A socket member 1 formed of non-conductive material carries at one side thereof the three spring contacts 2, 3, and 4 and at the opposite sides the three spring contacts 5, 6 and 7. Said member also carries the pair of spring members 8 and 8' the inner end of each of which has a piece 9 of insulating material thereon. The parts are so arranged that when the plug 10 is withdrawn from the socket member the members 8 and 8' will move together and the metal parts of these members will contact the ends of the contacts 2 and 5 so that these members 2 and 5 will be electrically connected with the members 8 and 8'. A pair of conductors 11 and 11' connect the members 8 and 8' with the two posts of the center cell of the battery and a conductor 12 connects the contact 2 with a post of one end cell and a conductor 12' connects the contact 5 with a post of the other end cell. A conductor 13 connects the contact 3 with the second post of the last-mentioned end cell and a conductor 13' connects the contact 6 with the second post of the other end cell. A conductor 14 connects the contact 4 with the conductor 11' and a conductor 14' connects the contact 7 with the conductor 11. The plug 10 is composed of a body 10' of non-conducting material and a metal strip 15 on one side thereof and a metal strip 16 on the opposite side thereof. The strip 15 will engage the piece of insulating material 9 on member 8 and will also engage the members 2, 3 and 4 when the plug is placed in the socket member and the strip 16 will engage the piece of insulating material 9 on member 8' and the members 5, 6 and 7 at the same time. Conductors 17 lead from the strips 15 and 16 to the radio. A pin 18 is carried by the body 10' for engaging a groove 19 in the socket member for insuring the plug being placed in the proper position in the socket member.

Figure 2:
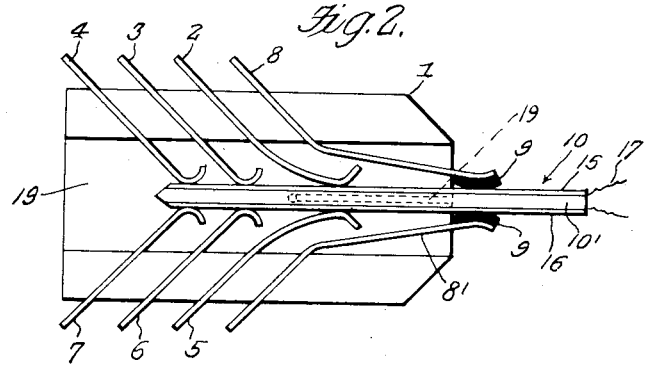
Figure 2 is a detail sectional view showing the plug removed from the socket member.
Figure 3:
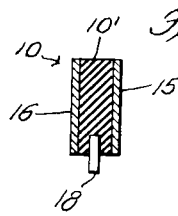
Figure 3 is a transverse sectional view through the plug.

As will be seen from Figure 2 when the plug 10 is withdrawn from the socket member the contacts 2 and 5 will engage the metal parts of the members 8 and 8' and then the cells of the battery will be connected in series so that the battery can be recharged in the usual manner. After the battery has been recharged the plug is inserted in the socket member which will cause the members 8 and 8' to move out of engagement with the contacts 2 and 5 and to connect the positive side of the three cells to the strip 15 and the negative side to the strip 16 so that the cells are connected in parallel for radio operation.

Thus the battery will last much longer than a one-cell battery before it needs recharging and the battery will have longer life as it will need less frequent charge and discharge cycles. The battery can be recharged with any six-volt generator without using a resistance and it costs less per cell to recharge a three-cell six-volt battery than it does to recharge a one-cell two-volt battery.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention what is claimed as new is:

A switch of the class described comprising a socket member, a plurality of pairs of spring contact members carried by the socket member, one pair of members normally engaging another pair of members, a plug of non-conductive material having spaced contact strips thereon, said plug when inserted in the socket member having one strip contacting one member of each pair and the other strip contacting the other member of each pair and said plug when inserted in the socket member moving said one pair of members out of engagement with the other pair of members and said one pair of members having non-conductive parts thereon engaging the strips of the plug when the plug is inserted in the socket member.

ELEANORA TOLLEFSON,
*Administratrix of the Estate of Orlo Alvin Tollefson, Deceased.*